O. S. WINKLER.
SPOKE EXTRACTOR.
APPLICATION FILED AUG. 8, 1911.
1,059,254.
Patented Apr. 15, 1913.
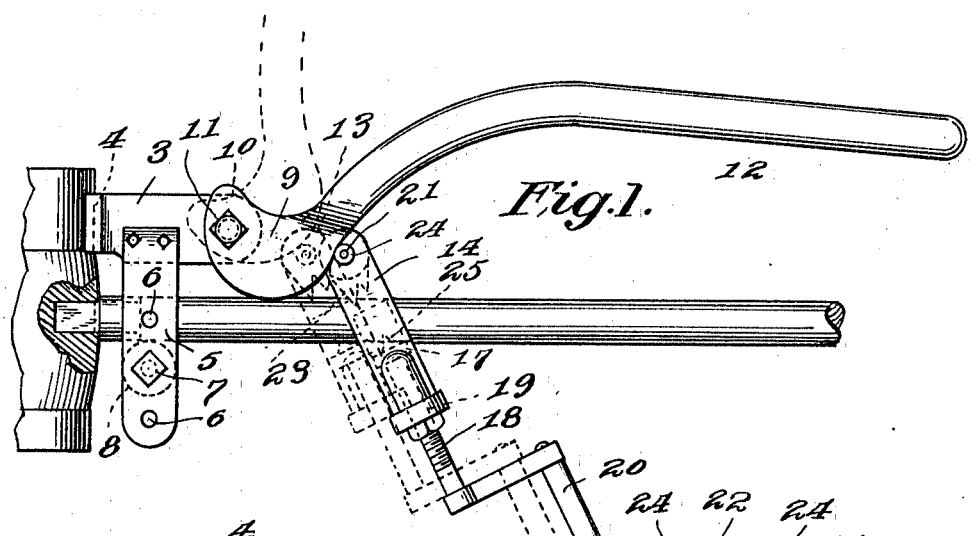
Fig. 1.
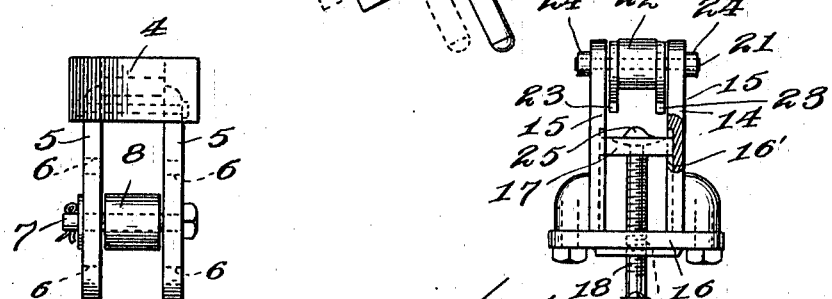
Fig. 2.
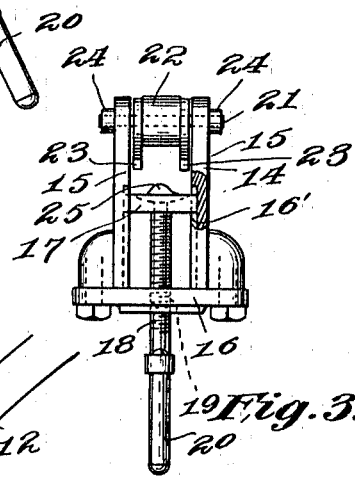
Fig. 3.
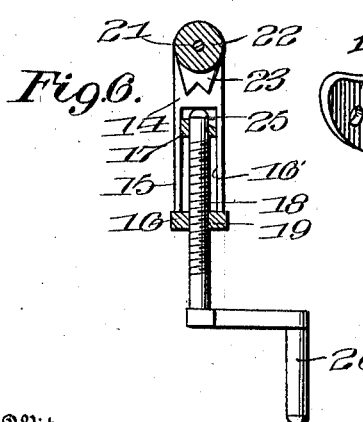
Fig. 6.
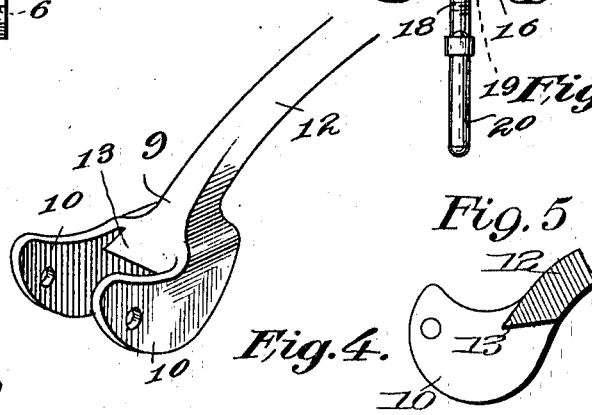
Fig. 4.
Fig. 5.
Witnesses
H. H. Lybrand
R. B. Cavanagh
Inventor
Oscar S. Winkler
By Victor J. Evans
Attorney
COLUMBIA PLANOGRAPH CO., WASHINGTON, D. C.

UNITED STATES PATENT OFFICE.

OSCAR S. WINKLER, OF BALTIMORE, MARYLAND, ASSIGNOR OF ONE-THIRD TO THEODORE MASS AND ONE-THIRD TO AUGUST BLUMKE, BOTH OF BALTIMORE, MARYLAND.

SPOKE-EXTRACTOR.

1,059,254.    Specification of Letters Patent.    Patented Apr. 15, 1913.

Application filed August 8, 1911. Serial No. 643,000.

*To all whom it may concern:*

Be it known that I, OSCAR S. WINKLER, a citizen of the United States, residing at Baltimore city, State of Maryland, have invented new and useful Improvements in Spoke-Extractors, of which the following is a specification.

This invention pertains to certain novel and useful improvements in spoke extractors, and has particular application to a device of the class described adapted for readily and quickly removing the spokes from the hub of a wheel.

In carrying out my invention, it is my purpose to provide a spoke extractor which will embody the desired features of simplicity, durability and efficiency and, furthermore, I aim to provide a device which may be easily and quickly placed in position on the spoke to be removed, and then operated by a single movement of a handle to withdraw the spoke from the socket in the hub.

With the above-recited objects, and others of a similar nature in view, the invention consists in the construction, combination and arrangement of parts, set forth in and falling within the scope of the appended claims.

In the accompanying drawing:—Figure 1 is a view in side elevation of a device embodying my invention, showing the same in position for the removal of a spoke from the hub. Fig. 2 is a front view of the hub engaging member and the supporting stirrup of the spoke extractor. Fig. 3 is a similar view of the spoke clamping mechanism forming a support and bearing for the operating handle which is pivoted to the hub engaging member. Fig. 4 is a perspective view of the cam lever. Fig. 5 is a fragmentary longitudinal sectional view through one end of the handle. Fig. 6 is a vertical sectional view through Fig. 3.

Referring now to the accompanying drawing in detail, the numeral 1 designates the hub of a vehicle wheel or the like and 2 indicates one of the spokes thereof.

My improved spoke extractor, as shown in the drawing, comprises a hub engaging member 3, which is in the nature of a bar or block having one end thereof formed with a recess or socket 4 adapted to engage with and fit the hub of the wheel. Connected to and depending from the hub engaging member 3 are the arms 5—5, suitably spaced apart and having transverse alining bores 6—6 therein for the reception of the bolt 7, the shank portion of the bolt extending between the two arms carrying the bearing roller 8.

It will be seen that by providing a plurality of bores along the arm, I form bearings by means of which the roller and its shaft or supporting bolt may be adjusted to accommodate spokes of various sizes. The arms, together with the bearing roller form a stirrup for the reception of the spoke, as is shown in Fig. 1, whereby the spoke extractor may be held in its applied position.

The numeral 9 indicates a bifurcated cam the jaws 10—10 of which receive between them and are pivotally secured to the adjacent end of the member 3 by means of the pivot bolt 11, while 12 indicates a handle, formed integral with the cam lever portion 9, said handle having extending therefrom a tongue 13 which projects between the jaws 10—10 for the purpose hereinafter described.

The numeral 14 designates a frame comprising the side bars 15—15 and the cross bar 16, said frame being designed to be moved along the spoke to be extracted. The side bars 15 are each longitudinally slotted as at 16' to form guide ways for the sliding head or block 17 which is actuated by means of the rotating screw shaft 18, which is threaded into the bore 19 in the cross bar 16, said screw shaft being provided with a crank or handle 20 by means of which it is actuated. At the upper ends of the side bars 15—15 of the frame is a cross shaft 21 carrying a bearing roller 22 and segment shaped spoke engaging spurs 23, while 24—24 are small rollers one at each end of the cross shaft 21, said rollers being adapted to form a bearing for the contacting surface of the cam jaws, as is shown in Fig. 1.

From the above description, taken in connection with the accompanying drawings, the construction and manner of employing my improved spoke extractor will be readily apparent. When the spoke is to be extracted, the device is assembled thereon as is shown in dotted lines in Fig. 1 so that the socket of the member 3 fits against the hub, while the roller 8 carried by the arms depending from the socket members is arranged below the spoke. The frame 14 of the clamping and bearing member is then shifted along the spoke, until the roller 22 projects upward between the two jaws of the cam member and contacts with the tongue 13, one of the segment shaped spurs engaging with the spoke, while the spur or point 25 of the block 17 bears against the opposite side of the spoke, this being accomplished by rotating the screw shaft through the crank or handle 20 thereof, which forces the block and spur into contact with the adjacent sides of the spoke. It will be seen that the spoke is engaged by the spurs, and the frame 14 is securely clamped thereon, the roller 22 bearing against the tongue 13.

The spokes may now be extracted by pushing downwardly on the handle 12 which causes the cam to bear against the roller 22 and the heel of the cam to bear against the rollers 24 so that when the handle is operated the spoke is withdrawn from the hub, the stirrup composed of the arms 5, 5 and the roller 8 embracing the spoke and permitting sliding movement thereof.

It will be noted that I have provided a spoke extracting device which may be quickly adjusted to the spoke and easily and conveniently operated to draw the spoke with a minimum expenditure of time and effort.

I claim:—

1. A spoke extractor comprising a member adapted to bear against the hub carrying the spoke, a spoke supporting member carried by the hub engaging member, a cam pivoted to said hub engaging member, and a bearing adjustably clamped upon the spoke adapted to form a bearing for the cam when the latter is operated to draw the spoke outward.

2. A spoke extractor comprising a socket member adapted to engage the hub carrying the spoke, a cam pivoted to said member, a handle for said cam terminating in a tongue, and a bearing secured to the spoke beneath the handle and adapted to be contacted with by the tongue of the handle when the latter is operated to draw the spoke outward.

3. A spoke extractor comprising a hub engaging member, a depending bearing for the spoke carried by the hub engaging member, a bifurcated cam pivoted to the hub engaging member, a handle connected to said cam, a projection extending from the handle between the jaws of the bifurcated cam, a frame adjustably mounted upon the spoke beneath the handle, a bearing carried by said frame and adapted to project beneath the bifurcated members of the cam and into contact with the projection of the handle, engaging spurs for the spoke carried by said bearing, and means for tightening the frame upon any position to the desired point of adjustment.

4. A spoke extractor comprising a member having a socket portion adapted to bear against the hub, a bearing for the spoke connected thereto, a cam member pivoted to the hub engaging member, an operating handle carried by the cam and provided with a tongue, a frame comprising side bars and a cross bar adapted to move along the spoke beneath the cam, a roller bearing carried by the frame and designed to be contacted with by the tongue, spurs adjacent to said roller for engaging with the spoke, a sliding block movable in the frame, a spur on said block for engaging with the spoke opposite to the first-mentioned spurs, a screw shaft for shifting said block in the frame, and a handle for operating the screw shaft.

In testimony whereof I affix my signature in presence of two witnesses.

OSCAR S. WINKLER.

Witnesses:
 THOS. F. SHRIVER,
 B. A. BLOCK.